US 6,708,997 B2

(12) United States Patent
Chait

(10) Patent No.: US 6,708,997 B2
(45) Date of Patent: Mar. 23, 2004

(54) HAND-POWERED VEHICLE

(76) Inventor: Paul Nicholas Chait, 366 Holly Dr., San Rafael, CA (US) 94903

( * ) Notice: Subject to any disclaimer, the term of this patent is extended or adjusted under 35 U.S.C. 154(b) by 51 days.

(21) Appl. No.: 09/948,512

(22) Filed: Sep. 7, 2001

(65) Prior Publication Data
US 2003/0047901 A1 Mar. 13, 2003

(51) Int. Cl.$^7$ ............................................... B62M 1/14
(52) U.S. Cl. ..................................... 280/245; 280/244
(58) Field of Search ............................. 280/242.1, 244, 280/245, 246, 247, 248; 482/62, 72

(56) References Cited

U.S. PATENT DOCUMENTS

| | | | | |
|---|---|---|---|---|
| 435,665 A | * | 9/1890 | Minnix | 280/245 |
| 843,646 A | * | 2/1907 | Vogel | 280/248 |
| 946,280 A | * | 1/1910 | Slotkin | 280/245 |
| 1,735,665 A | * | 11/1929 | Ashby | 280/245 |
| 2,085,657 A | * | 6/1937 | Heisdorf | 280/245 |
| 4,460,190 A | * | 7/1984 | Spiess | 280/247 |
| 4,861,055 A | * | 8/1989 | Jones | 280/254 |
| 5,653,663 A | * | 8/1997 | McCahon | 280/245 |
| 6,352,274 B1 | * | 3/2002 | Redman | 280/248 |

FOREIGN PATENT DOCUMENTS

| | | | | |
|---|---|---|---|---|
| JP | 4-243681 | * | 8/1992 | 280/245 |

* cited by examiner

Primary Examiner—Daniel G. DePumpo
(74) Attorney, Agent, or Firm—Risto A. Rinne

(57) ABSTRACT

A wheeled apparatus is provided that converts alternate back and forth longitudinal motion supplied by the arms of a user to a pair of members into rotary motion that is used to drive the apparatus forward. The members drive special rack gears that include upper and side gear teeth. An idler gear engages the side teeth and maintains alignment between the two rack gears. The upper teeth of each rack gear drive a first gear of a pair of coaster gears. When the first gear is rotated or driven in a first direction a second gear of each coaster gear also rotates in the first direction. When the first gear is rotated in an opposite direction, the second gear is adapted to coast. Each second gear is operatively connected to a first and to a second driven gear by a first and second chain respectively. The first and second driven gears are attached to a rear wheel of the apparatus and which each are adapted to urge the apparatus forward.

13 Claims, 1 Drawing Sheet

HAND-POWERED VEHICLE

BACKGROUND OF THE INVENTION

1. Field of the Invention

The present invention, in general relates to wheeled vehicles and, more particularly, to mobile types of devices that are powered by hand.

Hand powered mobile devices are generally known. For example, hand-powered rail carts for use on railroad tracks that have a central pivotal bar that is alternately raised and lowered are well known devices that can be powered by one or more persons simultaneously, but they are not practical for use on the street, especially by an individual operator. There are a number of reasons why these, and other prior art types of devices, are not well suited for individual use or for use on the street.

One such reason is because they tend to have large, cumbersome mechanisms and, as such, do not lend themselves well for use with smaller and lighter types of vehicles, for example, with two or three-wheeled types of scooters.

Recent developments in lightweight and durable materials have contributed to a great variety of small, folding types of scooters. These include two-wheeled types of mobile devices that are propelled by an individual standing on a platform of the scooter and kicking with one leg to propel the device.

This type of a kicking impulse makes for limited and inefficient use of the strengths of the individual and furthermore, because the individual is likely to use only a predominant leg for kicking, it fosters an uneven pattern of physical development (i.e., exercise).

It is desirable to be able to use the arms and hands of the individual to supply a motive force for a smaller, scooter-like, vehicle yet no lightweight and effective mechanism currently exists for doing so.

It is also desirable to use the muscle groups in the arms to supply this force. The arms have substantial muscle groups that, if an ergonomic system were to well utilize them, are well adapted to propel a scooter-like type of a vehicle.

Furthermore, doing so would strengthen the upper body while simultaneously providing a practical vehicle for short distance commuting.

Furthermore, prior types of hand powered devices do not provide a method for synchronizing the motion of both hands (and arms) of the user so that an alternating pushing and pulling motion, each arm at a time and in opposite relation to the other, would occur. Such a synchronized pattern of movement is optimally desired to provide the motive impulse.

A synchronized motion that ensures a particular relative position of one hand alternating back and forth when compared to the other is optimum for both power generation and also for comfort.

It is preferable to set up a routine whereby a recurrent pattern of motion occurs. This is one reason why pedaling a bicycle is so common. It involves a recurrent pattern of motion and that creates familiarity and the familiarity, in turn, fosters user comfort and confidence in the process and product.

Also, kicking a scooter provides a motive force (i.e., an impulse) and then the scooter coasts for a predetermined period of time until another kick can be accomplished. In other words the motive force is intermittent. It is desirable to be able to supply a more continuous motive force (i.e., one with a greater duty cycle whereby motive power is being supplied most of the time) to a scooter-like vehicle.

Accordingly, there exists today a need for a hand-powered vehicle that is lightweight, effectively transfers power derived from the hand and arm motion of the user into rotary motion that is used as a motive force, provides this force more evenly and continuously than by kicking, and which provides a positive and predictable relationship between two members that are alternately moved back and forth by the user.

Clearly, such an apparatus would be a useful and desirable device.

2. Description of Prior Art

Hand-powered vehicles are, in general, known. For example, the following patents describe various types of these devices:

U.S. Pat. No. 6,080,088 to Petersen et al., Jun. 27, 2000;
U.S. Pat. No. 5,050,864 to Pertramer, Sep. 24, 1991;
U.S. Pat. No. 5,007,655 to Hanna, Apr. 16, 1991;
U.S. Pat. No. 4,960,286 to Henson, Oct. 2, 1990;
U.S. Pat. No. 4,861,055 to Jones, Aug. 29, 1989;
U.S. Pat. No. 4,189,166 to Lindsey, Feb. 19, 1980;
U.S. Pat. No. 2,085,657 to Heisdorf, Jun. 29, 1937;
U.S. Pat. No. 1,735,665 to Ashby, Nov. 12, 1929;
U.S. Pat. No. 1,455,124 to Swinland, May 15, 1923;
U.S. Pat. No. 926,131 to McGowan, Jun. 29, 1909; and
U.S. Pat. No. 577,572 to Cross, Feb. 23, 1897.

While the structural arrangements of the above described devices, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a hand-powered vehicle that is lightweight.

It is also an important object of the invention to provide a hand-powered vehicle that is reliable to use.

Another object of the invention is to provide a hand-powered vehicle that includes a method for varying a mechanical advantage sufficient to change the force that is required in order to effectively impel the vehicle.

Still another object of the invention is to provide a hand-powered vehicle that includes a method for varying a gear ratio sufficient to change the force that is required to impel the vehicle.

Still yet another object of the invention is to provide a hand-powered vehicle that includes a method for varying the length of a moment arm sufficient to change the force that is required to impel the vehicle.

Yet another important object of the invention is to provide a hand-powered vehicle that provides a fixed and predictable relationship between two members that are alternately moved back and forth by a user.

Still yet another important object of the invention is to provide a hand-powered vehicle that includes a hand-powered scooter.

Still yet one further important object of the invention is to provide a hand-powered vehicle that eliminates "dead spots" in the motive power supply process.

Briefly, hand-powered vehicle that is constructed in accordance with the principles of the present invention has a platform and at least two wheels that are attached to the platform. A user stands on the platform. An apparatus for converting an alternating back and forth motion by two arms of the user into a rotary motion is provided and is adapted to supply a torque to a drive wheel. The apparatus includes a first rack gear and a second rack gear and an idler gear operatively disposed therebetween. Accordingly, the first rack gear and the second rack gear move in opposite directions with respect to each other. The arms supply the necessary force to a pair of pivoting members sufficient to drive the first and second rack gears which in turn engage with a first and second coaster gear respectively. The coaster gears engage with the drive wheel sufficient to urge the vehicle forward. When a first arm is pulled rearward a remaining arm moves forward and when the remaining arm is pulled rearward the first arm moves forward. Accordingly, a back and forth repetitive motion of the arms is used to urge the vehicle forward and to provide a more continuous motive force.

DETAILED DESCRIPTION OF THE INVENTION

Figure 1:
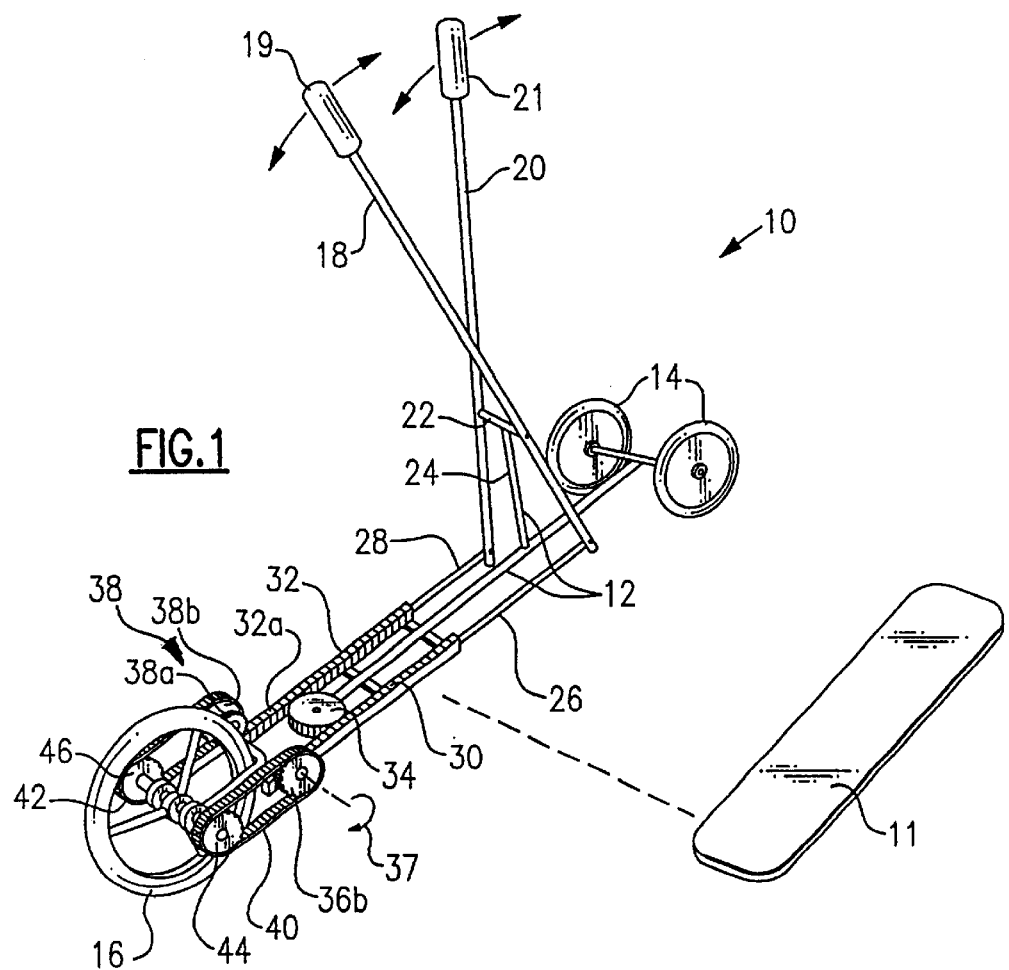
FIG. 1 is a perspective of a hand-powered vehicle.

Referring to FIG. 1 is shown, a hand-powered vehicle, identified in general by the reference numeral 10 and hereinafter referred to as a "scooter 10".

The scooter 10 is shown with a platform 11 removed therefrom and displaced off to the side. The platform 11 is removed to better reveal the novel drive gearing assemblies of the scooter 10.

The platform 11 is placed over the gearing assemblies (described in greater detail hereinafter) on a frame assembly 12 (partially shown) and intermediate a front pair of wheels 14 and a rear drive wheel 16. The platform 11 is attached to the frame 12 by well known methods, such as by bolting or welding.

The frame 12 also supports a first member 18 and a second member 20. The first and second members 18, 20 pivot forward and backward (with respect to a longitudinal axis of the frame 12) about a cross tube 22 that is attached to an upright member 24 of the frame 12.

A user (not shown) grasps an upper right hand-grip 19 with his right hand and an upper left hand-grip 21 with his left hand. Force is applied by the arms of the user to the first and second members 18, 20 which are, in turn, alternately pulled backwards. The user stands on the platform 11 during normal use.

If desired, one of the members 18, 20 may also be urged (i.e., pushed) forward while the opposite member is pulled backward so as to better utilize the muscle groups of the user and to provide an even more continuous duty cycle to the power impulse.

Each of the first and second members 18, 20 are pivotally attached at an end opposite the right hand-grip 19 and the left hand-grip 21 to one end of a first push rod 26 and a second push rod 28, respectively.

The remaining end of each push rod 26, 28 is attached to a first rack gear 30 and to a second rack gear 32. Each of the rack gears 30, 32 are essentially a longitudinal flat member with upper gear teeth disposed along the upper longitudinal length thereof.

The rack gears 30, 32 also each include a plurality of inner gear teeth which bear against a center idler gear 34 that is also supported by the frame 12. The idler gear 34 mechanically connects the two racks 30, 32 together.

The idler gear 34 includes a longitudinal center axis about which it pivots that is perpendicular with respect to the longitudinal center axis of the drive wheel 16.

Therefore, if one were to displace longitudinally only one of the members (either 18 or 20) the remaining member 18, 20 would automatically move in the opposite direction because of the idler gear 34. As such, a positive relationship is established between the position of the rack gears 30, 32 and accordingly, between the first and second members 18, 20.

For example, if the user were to pull only the first member 18 in a rearward direction, the second member 20 would move forward in the opposite direction.

The upper gear teeth of the racks 30, 32 respectively drive a first coaster gear 36 and a second coaster gear 38. When either of the racks 30, 32 is moving in a rearward direction, the coaster gear 36, 38 that is above it is being driven by the rearward movement of the rack 30, 32 in a first direction as shown by arrow 37. Each one of the two coaster gears 36, 38 serves a means for providing a clutch (i.e., "a clutch means"), the operation of which is described in greater detail hereinafter.

Figure 2:
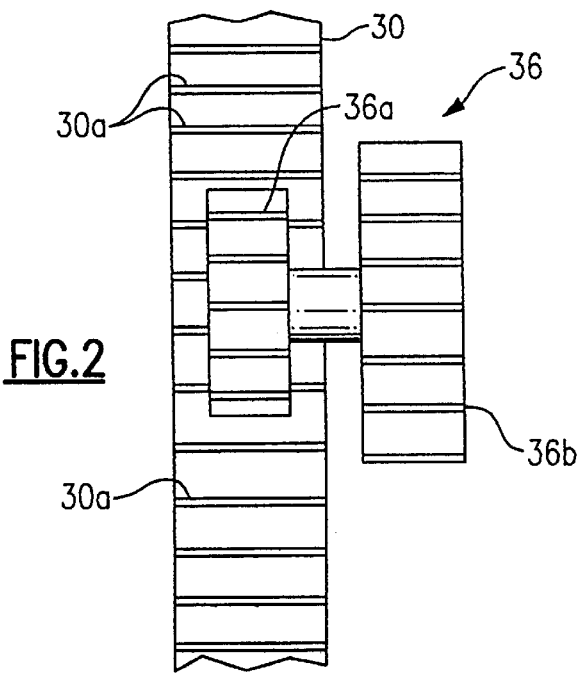
FIG. 2 is an enlarged detail top planar view of a coaster gear of the hand-powered vehicle.

This is accomplished by upper gear teeth 30a of the first rack gear 30 engaging with a first gear 36a of the first coaster gear 36 and with upper gear teeth 32a of the second rack gear 32 engaging with a first gear 38a of the second coaster gear 38 (refer also to FIG. 2).

The first gears 36a, 38a are disposed on the inside of the frame 12 and over the upper gear teeth 30a, 32a of the first and second rack gears 30, 32 with which they are adapted to engage and cooperate.

When either rack gear 30, 32 moves rearward, the first gear 36a or 38a moves in the first direction as shown by arrow 37. When either of the first gears 36a, 38a moves in the first direction, the respective coaster gear 36, 38 causes a second gear 36b, 38b to also engage and to be urged to move in the first direction.

The second gears 36b, 38b each drive a first and second chain 40, 42 respectively which in turn are each adapted to drive a first and second driven gear 44, 46. The first and second driven gears 44, 46 are attached to opposite sides of the rear drive wheel 16.

Accordingly, when either the second gear 36b of the first coaster gear 36 moves in the first direction or when the second gear 38b of the second coaster gear 38 moves in the first direction, a rotary force is applied to the first and second driven gears 44, 46 which, in turn, each successively drives the rear wheel 16 and moves the scooter 10 in a forward direction.

When either the first or second rack gear 30, 32 moves forward the respective second gear 36b 38b is allowed to coast. Whenever there is longitudinal movement of the rack gears 30, 32 it is inevitable that one of them is moving forward while the other is moving backward.

Therefore, one of the rack gears 30, 32 is always driving one of the coaster gears 36, 38 in the first direction which is driving one of the second gears 36b, 38b which, in turn, is driving one of the driven gears, 44, 46.

The pair of front wheels 14 are adapted to pivot about an offset center axis so that they turn left or right when the scooter 10 is leaned in the appropriate direction.

If desired, the pair of front wheels 14 could be replaced by a single front wheel to provide a more conventional looking type of a two-wheeled scooter (not shown). The advantage to using a total of three or more wheels is that the scooter 10 is able to maintain itself in an upright attitude without falling over.

Similarly, if desired the rear drive wheel 16 could be replaced with either a pair of rear drive wheels (not shown) or an additional coaster-type of a rear wheel (not shown) may be added to the scooter 10.

In use an operator (i.e., the user) stands on the platform 11 of the scooter 10 and urges the members 18, 20 alternately back and forth which propels the scooter 10 and the user in a forward direction.

There are a number of ways to adjust the force that is required to propel the scooter 10. The ratio between the first gear 36a, 38a and the second gear 36b and 38b may be varied as desired. As the first gear 36a, 36a increases in diameter as compared with the second gear 36b, 38b, the force required to move the scooter 10 is lessened as is the distance that can be covered (traversed) for each stroke of the members 18, 20.

Changes made between the gear ratio of the second gear 36b, 38b as compared to the first and second driven gears 44, 46 by increasing the size of the driven gears 44, 46 would produce a similar decrease in the force required as well as the distance covered per stroke.

Another way to change the effective overall mechanical advantage is by raising or lowering the location of the cross tube 22 along the longitudinal length of the first and second members 18, 20.

If the cross tube 22 is lowered, then the upper portion (that portion which is above the cross tube 22) of the members 18, 20 is increased while the lower portion (that portion which is below the cross tube 22) is decreased.

This would increase the overall mechanical advantage resulting in less force having to be applied to the members 18, 20 in order to move the scooter 10 and also in less distance being covered for each stroke of the members 18, 20 because the length of the stroke of each of the rack gears 30, 32 would accordingly be lessened accordingly.

Conversely, changes that decrease the mechanical advantage result in a greater force being required to urge the scooter 10 forward and also in a greater length of travel of the scooter 10 for each stroke that is made.

Certain elements that are obvious to those having ordinary skill in the art and whom have benefited from the instant disclosure have been omitted from the drawings for purposes of clarity. For example, the support structures that attach the coaster gears 36, 38 to the frame 12 are not shown nor are shown the tracks that retain and in which the rack gears 30, 32 slide back and forth.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A hand-powered vehicle adapted for motion powered by certain of the muscles of a user, comprising:
   (a) a platform
   (b) at least two wheels attached to said platform;
   (c) means for converting an alternating back and forth motion by two arms of said user into a rotary motion that is adapted to supply a torque to at least one of said at least two wheels and wherein when one arm is being pulled rearward the remaining arm is moving forward and wherein when said remaining arm is being pulled rearward said one arm is moving forward and wherein said torque is adapted to urge said hand-powered vehicle in a forward direction; and wherein said means for converting an alternating back and forth motion by two arms of said user into a rotary motion is adapted to supply said torque when a first force is alternately applied by said one arm to a first member sufficient to urge said first member from said forward position into said rearward position and wherein when said first member is disposed at said rearward position said second force is applied by said remaining arm to said second member sufficient to urge said second member from said forward position into said rearward position; and wherein when said first force is being applied said second force is diminished and when said second force is being applied said first force is diminished; and wherein said means for converting an alternating back and forth motion by two arms of said user into a rotary motion includes first and second clutch means and a first rack gear and a second rack gear and wherein said first rack gear is adapted to move in a forward longitudinal direction subsequent to said first member being urged in said rearward direction and wherein said second rack gear is adapted to move in a forward longitudinal direction subsequent to said second member being urged in said rearward direction and wherein said first rack gear is adapted to rotate said first clutch means in a first direction when said second member is urged in said rearward direction and in an opposite second direction when said first member is urged in said rearward direction and wherein said second rack gear is adapted to rotate said second clutch means in said first direction when said first member is urged in said rearward direction and in an opposite second direction when said second member is urged in said rearward direction, and wherein said first clutch means is adapted to supply said torque to at least one of said at least two wheels when said second member is urged in said rearward direction and wherein said second clutch means is adapted to supply said torque to at least one of said at least two wheels when said first member is urged in said rearward direction; and wherein said vehicle includes a single rear wheel and a pair of front wheels, said pair of front wheels disposed in a spaced apart parallel orientation with respect to each other and wherein when said vehicle is leaned in a first direction said pair of front wheels are adapted to tilt so as to steer said vehicle in said first direction and when said vehicle is leaned in an opposite second direction said pair of front wheels are adapted to tilt so as to steer said vehicle in said second direction; and including an idler gear operatively connected intermediate said first rack gear and said second rack gear whereby said idler gear is adapted to ensure that when said first rack gear moves longitudinally in said forward longitudinal direction, said second rack gear moves in an opposite longitudinal direction and wherein when said second rack gear moves longitudinally in said forward longitudinal direction said first rack gear moves in an opposite longitudinal direction; and wherein said means for converting an alternating back and forth motion by two arms of said user into a rotary motion is adapted to produce said rotary motion if a first of said two arms is used to urge either said first or said second member alternately back and forth when said remaining one of said two arms is not being used to urge either said first or said second member and wherein said first and said second members require a user to stand on said platform.

2. The hand-powered vehicle of claim 1 wherein said vehicle is a scooter.

3. The hand-powered vehicle of claim 1 wherein said means for converting an alternating back and forth motion by two arms of said user into a rotary motion is adapted to supply said torque when a first force is applied by said one arm to a first member sufficient to urge said first member from a forward position into a rearward position.

4. The hand-powered vehicle of claim 3 wherein said means for converting an alternating back and forth motion by two arms of said user into a rotary motion is adapted to supply said torque when a second force is applied by said remaining arm to a second member sufficient to urge said second member from a forward position into a rearward position.

5. The hand-powered vehicle of claim 1 wherein said first rack gear includes a plurality of gear teeth adapted to cooperate with said idler gear and wherein said second rack gear includes a plurality of gear teeth adapted to cooperate with said idler gear.

6. The hand-powered vehicle of claim 1 wherein said first clutch means includes a first coaster gear assembly and wherein said second clutch means includes a second coaster gear assembly, and wherein each of said first and second coaster gear assemblies include a first gear and a second gear and wherein said first gear of said first coaster gear assembly is adapted to rotate in said first direction when said second member is urged in said rearward direction and in said opposite second direction when said first member is urged in said rearward direction and wherein said first gear of said second coaster gear assembly is adapted to rotate in said first direction when said first member is urged in said rearward direction and in said opposite second direction when said second member is urged in said rearward direction and wherein when said first gear of said first coaster gear assembly is urged to rotate in said first direction it is adapted to rotate said second gear of said first coaster gear assembly in said first direction and wherein when said first gear of said second coaster gear assembly is urged to rotate in said first direction it is adapted to rotate said second gear of said second coaster gear assembly in said first direction.

7. The hand-powered vehicle of claim 6 including a first driven gear and a second driven gear and wherein said first gear of said first coaster gear assembly is adapted to rotate said first driven gear in said first direction when said first gear of said first coaster gear assembly is rotated in said first direction and wherein said first gear of said second coaster gear assembly is adapted to rotate said second driven gear in said first direction when said first gear of said second coaster gear assembly is rotated in said first direction.

8. The hand-powered vehicle of claim 7 wherein said first gear of said first coaster gear assembly is adapted to permit said second gear of said first coaster gear assembly to coast when said first gear of said first coaster gear assembly is rotated in said second direction and wherein said first gear of said second coaster gear assembly is adapted to permit said second gear of said second coaster gear assembly to coast when said first gear of said second coaster gear assembly is rotated in said second direction.

9. The hand-powered vehicle of claim 8 including first drive means intermediate said first clutch means and said first driven gear, whereby said first drive means is adapted to supply a torque to said first driven gear and including second drive means intermediate said second clutch means and said second driven gear, whereby said second drive means is adapted to supply a torque to said second driven gear.

10. The hand-powered vehicle of claim 9, wherein said first drive means includes a first chain that is disposed in a circle around said second gear of said first coaster gear assembly and said first driven gear and wherein said second drive means includes a second chain that is disposed in a circle around said second gear of said second coaster gear assembly and said second driven gear.

11. The hand-powered vehicle of claim 9 including means for varying the magnitude of said torque that is applied to at least one of said at least two wheels.

12. The hand-powered vehicle of claim 11 wherein said means for varying the magnitude of torque includes means for varying a length of stroke of said first and said second rack gears for any given length of stroke that is experienced by said first and said second members, respectively.

13. The hand-powered vehicle of claim 11 wherein said means for varying the magnitude of torque includes means for varying a gear ratio intermediate said first rack gear and said first driven gear and intermediate said second rack gear and said second driven gear.

* * * * *